(12) United States Patent
Roberts et al.

(10) Patent No.: US 10,551,724 B2
(45) Date of Patent: Feb. 4, 2020

(54) MOTORIZED MONOPOD JIB FOR CAMERAS

(71) Applicant: Disney Enterprises, Inc., Burbank, CA (US)

(72) Inventors: Vincent H. Roberts, Thousand Oaks, CA (US); Kenneth D. Salter, Glendale, CA (US); Anthony M. Accardo, Glendale, CA (US); Miquel Angel Farre Guiu, Bern (CH); Gunter Niemeyer, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/275,604

(22) Filed: Sep. 26, 2016

(65) Prior Publication Data

US 2017/0010521 A1    Jan. 12, 2017

Related U.S. Application Data

(63) Continuation of application No. 14/172,442, filed on Feb. 4, 2014, now Pat. No. 9,454,064.

(51) Int. Cl.
*H04N 5/232* (2006.01)
*G03B 17/56* (2006.01)
(Continued)

(52) U.S. Cl.
CPC ........... *G03B 17/561* (2013.01); *F16M 11/10* (2013.01); *F16M 11/18* (2013.01); *F16M 13/04* (2013.01);
(Continued)

(58) Field of Classification Search
CPC .................................................. H04N 5/23261
(Continued)

(56) References Cited

U.S. PATENT DOCUMENTS

| 4,017,168 A | 4/1977 | Brown |
| 4,946,272 A | 8/1990 | Brown |

(Continued)

FOREIGN PATENT DOCUMENTS

| CN | 202647109 U | 1/2013 |
| CN | 203811969 U | 9/2014 |

(Continued)

OTHER PUBLICATIONS

Afanasiev, Andrey, European Search Report for European Patent Application Serial No. 16183612, dated Mar. 17, 2017, 3 pages, The Hague, Netherlands.

(Continued)

*Primary Examiner* — Anthony J Daniels
(74) *Attorney, Agent, or Firm* — Patterson + Sheridan, LLP (57) ABSTRACT

One embodiment provides a monopole for a camera, including: a pole of length sufficient for two handed operation; an offset arrangement attached to an end of the pole, the offset arrangement comprising a first element connected at an angle to the end of the pole and a second element connected to the first element; the first element rotating about a first axis with respect to the end of the pole; the second element rotating about a second axis with respect to the first element; a camera mount attached to the second element, wherein the camera mount rotates about a third axis with respect to the second element; and at least one motor aligned with the first, the second or the third axis and imparting movement to the camera mount with respect to the pole in at least one degree of freedom selected from the group consisting of tilt, pan and roll. Other aspects are described and claimed.

20 Claims, 4 Drawing Sheets

(51) Int. Cl.
*F16M 11/10* (2006.01)
*F16M 13/04* (2006.01)
*F16M 11/18* (2006.01)

(52) U.S. Cl.
CPC ... *H04N 5/23203* (2013.01); *F16M 2200/041* (2013.01); *H04N 5/232* (2013.01)

(58) Field of Classification Search
USPC .......................................................... 348/373
See application file for complete search history.

(56) References Cited

U.S. PATENT DOCUMENTS

| | | | |
|---|---|---|---|
| 5,065,249 A | 11/1991 | Horn et al. | |
| 5,963,749 A | 10/1999 | Nicholson | |
| 6,611,662 B1* | 8/2003 | Grober | A61G 13/10 396/421 |
| 6,808,324 B2 | 10/2004 | McKay | |
| 7,209,176 B2 | 4/2007 | Chapman | |
| 7,241,060 B2 | 7/2007 | Mootz et al. | |
| 7,355,627 B2* | 4/2008 | Yamazaki | H04N 7/188 348/143 |
| 7,522,213 B2 | 4/2009 | Chapman | |
| 7,931,412 B2 | 4/2011 | Brown | |
| 8,125,564 B2* | 2/2012 | Kozlov | B66F 11/048 224/185 |
| 8,143,083 B2 | 3/2012 | Ohta | |
| 8,534,934 B1* | 9/2013 | Carney | F16M 11/02 248/178.1 |
| 9,156,154 B2 | 10/2015 | Brown et al. | |
| 9,360,740 B2 | 6/2016 | Wagner et al. | |
| 9,454,064 B2 | 9/2016 | Roberts et al. | |
| 9,534,730 B2 | 1/2017 | Black et al. | |
| 9,749,522 B2 | 8/2017 | Holmes | |
| 9,765,926 B2 | 9/2017 | Chen et al. | |
| 9,798,221 B2 | 10/2017 | Niemeyer et al. | |
| 9,851,046 B2 | 12/2017 | Pan et al. | |
| 9,874,308 B2 | 1/2018 | Saika et al. | |
| 9,904,147 B2 | 2/2018 | Zhao | |
| 9,921,459 B2 | 3/2018 | Wagner et al. | |
| 9,973,665 B2 | 5/2018 | Saha et al. | |
| 10,107,446 B2 | 10/2018 | Pan et al. | |
| 10,208,887 B2 | 2/2019 | Tian et al. | |
| 2004/0223078 A1 | 11/2004 | Zadok | |
| 2005/0185089 A1 | 8/2005 | Chapman | |
| 2009/0003822 A1 | 1/2009 | Tyner | |
| 2011/0158619 A1* | 6/2011 | Kanayama | G02B 27/646 396/55 |
| 2012/0099851 A1* | 4/2012 | Brown | F16M 13/04 396/421 |
| 2014/0350395 A1* | 11/2014 | Shachaf | G06T 7/0012 600/431 |
| 2015/0219981 A1 | 8/2015 | Roberts et al. | |
| 2016/0033077 A1 | 2/2016 | Chen et al. | |
| 2016/0170289 A1 | 6/2016 | Matt | |
| 2016/0246162 A1 | 8/2016 | Niemeyer et al. | |
| 2016/0309080 A1 | 10/2016 | Chu et al. | |
| 2016/0323496 A1 | 11/2016 | Tsai et al. | |
| 2017/0159875 A1 | 6/2017 | Wagner et al. | |
| 2017/0227162 A1 | 8/2017 | Saika et al. | |
| 2018/0149949 A1 | 5/2018 | Kim et al. | |
| 2018/0273203 A1 | 9/2018 | Zhang et al. | |
| 2018/0274720 A1 | 9/2018 | Gubler et al. | |
| 2018/0335178 A1 | 11/2018 | Bin et al. | |
| 2019/0002125 A1 | 1/2019 | Bin et al. | |

FOREIGN PATENT DOCUMENTS

| | | |
|---|---|---|
| CN | 203812021 U | 9/2014 |
| CN | 104360690 A | 2/2015 |
| CN | 204227000 U | 3/2015 |
| CN | 204437648 U | 7/2015 |
| CN | 106168326 A | 11/2016 |
| EP | 2919064 A1 | 9/2015 |
| EP | 3316567 A1 | 5/2018 |
| ES | 2564393 A1 | 3/2016 |
| KR | 20160099437 A | 8/2016 |
| WO | 2016190994 A1 | 12/2016 |

OTHER PUBLICATIONS

Gil Zamorano, Gunnar, European Search Report for European Patent Application Serial No. 17194823, dated Mar. 7, 2018, 3 pages, Munich, Germany.

Lantsheer, Martijn, European Search Report for European Application No. EP18178234, dated Oct. 30, 2018, The Hague, Netherlands, 6 pages.

* cited by examiner

MOTORIZED MONOPOD JIB FOR CAMERAS

CROSS REFERENCE TO RELATED APPLICATIONS

This application is a continuation application of U.S. patent application Ser. No. 14/172,442, filed on Feb. 4, 2014, the contents of which are incorporated by reference herein.

BACKGROUND

Counterbalancing arrangements for cameras attempt to provide stabilization to the camera during mobile use. For example, a conventional counterbalancing arrangement includes a camera mounting portion, e.g., a platform to which the camera attaches to, and a counterbalance, e.g., a counterbalancing arm. Counterbalancing systems act like a suspension to isolate the camera from roll and pitch disturbances. The counterbalance is arranged such that the camera is attached to a pendulum which acts as a low pass filter.

Counterbalancing arrangements for cameras, examples including the "FLOWPOD", produced by VariZoom, and the Mini Motion-Cam Stabilizer, produced by Hague, therefore conceptually provide stability to a camera mounted on the arrangement. Counterbalancing is useful or even necessary in certain circumstances, e.g., maintaining stability of the camera when it is moved about, e.g., by a camera operator walking while capturing video.

A variety of camera moving devices are used in film and broadcasting as well. These camera moving devices include dollies for lateral tracking shots, jib cranes for horizontal and vertical tracking shots, and camera car mounts for external tracking shots of actors in a moving automobile. Also, other difficult to set up shots employ ad-hoc solutions. For example, such solutions include a doggie cam (producing low tracking shot), a parade cam (producing a shot peering over the head and shoulders in a crowd), a foxhole cam (producing a shot peering out of a protected barrier), a ceiling cam (producing a shot looking down at the actors from above), etc.

While custom or ad-hoc solutions may be acceptable in certain situations, the need for customized equipment increases cost. In addition, passive steady-cams, which stabilize a moving, handheld camera in four (4) degrees of freedom (i.e., pan/yaw, tilt, roll, and heave), require expensive body mounted equipment and operator training.

BRIEF SUMMARY

In summary, one embodiment provides a method for operating a camera attached to a monopole, comprising: grasping the monopole with one or more hands; said monopole comprising a pole having an offset arrangement attached to an end of the pole, the offset arrangement comprising a first element connected at an angle to the end of the pole and a second element connected to the first element; the first element rotating about a first axis with respect to the end of the pole; the second element rotating about a second axis with respect to the first element; a camera mount attached to the second element, wherein the camera mount rotates about a third axis with respect to the second element; and at least one motor aligned with the first, the second or the third axis; and providing control input to the monopole to move the camera mount with respect to at least one element selected from the group consisting of the first element, the second element, and the pole; whereby the at least one motor automatically imparts movement to the camera mount in at least one degree of freedom selected from the group consisting of tilt, pan and roll in response to the control input.

Another embodiment provides a method for operating a camera attached to a monopole, comprising: grasping the monopole with one or more hands; said monopole comprising a pole having an offset arrangement attached to an end of the pole, the offset arrangement comprising a first element connected at an angle to the end of the pole and a second element connected to the first element; the first element rotating about a first axis with respect to the end of the pole; the second element rotating about a second axis with respect to the first element; a camera mount attached to the second element, wherein the camera mount rotates about a third axis with respect to the second element; and at least one motor aligned with the first, the second or the third axis; and providing control input to the monopole to move the camera mount with respect to at least one element selected from the group consisting of the first element, the second element, and the pole; whereby the at least one motor automatically imparts movement to the camera mount in at least one degree of freedom selected from the group consisting of tilt, pan and roll in response to the control input.

A further embodiment provides a system, comprising: a monopole for a camera, comprising: a pole of length sufficient for two handed operation; an offset arrangement attached to an end of the pole, the offset arrangement comprising a first element connected at an angle to the end of the pole and a second element connected to the first element; the first element rotating about a first axis with respect to the end of the pole; the second element rotating about a second axis with respect to the first element; a camera mount attached to the second element, wherein the camera mount rotates about a third axis with respect to the second element; one or more orientation sensors; a controller operatively coupled to the one or more orientation sensors; and at least one motor operatively coupled to the controller and aligned with the first, the second or the third axis; wherein the at least one motor responds to outputs of the controller to impart movement to the camera mount with respect to the pole in at least one degree of freedom selected from the group consisting of tilt, pan and roll.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation. The following description is intended only by way of example, and simply illustrates certain example embodiments.

An embodiment provides a hand held jib, e.g. a counterbalanced monopod jib as described in co-pending and commonly assigned U.S. patent application Ser. No. 13/843,878, filed on Mar. 15, 2013 and incorporated by reference herein, with degree(s) of freedom, e.g., tilt, roll and/or pan, that are motorized and actively controlled such that they remain under an operator's control.

In an embodiment, a camera head or mount is provided that is inertially stabilized in roll and tilt by active control. A degree of freedom, e.g., the tilt angle, may be biased through operator command, e.g., to be at a constant angle relative to the horizon, which is independent of the jib/monopole tilt angle. Thus, the jib may be tilted up and down with the camera automatically responding in the inverse fashion to keep the camera at a constant tilt angle. Another embodiment includes adding a pan degree of freedom. As with other degrees of freedom, the pan angle also may be inertially stabilized or it may be commanded to an arbitrary angle, e.g., relative to the jib.

An embodiment incorporates sensors and motors, e.g., inertial or orientation sensors and brushless electric motors, respectively, arranged on a two or three axis gimbal or camera mount connection to automatically stabilize the camera roll and pitch when the user moves the monopod. The camera's yaw and pitch angles may be modified with user operated controls, e.g., disposed in the monopod or in an element including controls and operatively coupled to the motor(s).

In another embodiment, a counterweight, e.g., on the rear end of the monopod, and a cupped fulcrum approximately one-third (⅓) of the way from the rear to front of the monopod are provided. This fulcrum rests on the operators shoulder and, in conjunction with the operator's arm for support, creates a vertical suspension degree of freedom (heave), similar to what is found in a full steady cam ("steadicam") type rig. Such an arrangement filters vertical impulses due to walking and stabilizes the camera in the vertical direction.

In another embodiment, sensors may be attached to the monopole, or to the rotating offset arrangement, or to the gimbal, or to the camera mounting platform, or to the camera. Such sensors may include orientation sensors, encoders, potentiometers, or inertial sensors and may be used to determine the orientation of any part of the apparatus.

A reason for attaching sensors to the monopole may be important in certain contexts, e.g., when low cost brushless motors are utilized. Such low cost brushless motors often do not have encoders. Thus, as the boom or monopole is tilted, the roll axis gradually becomes the yaw axis. As the controller attempts to level roll, instead, it may cause undesirable yaw motion. A tilt orientation sensor, e.g., mounted on the monopod, thus may find use in suppressing the action of the roll motor, e.g., for larger tilt angles.

In a further arrangement, the sensors may be used to provide inputs to a controller which automatically regulates the motion of one, two, or any of the motors. This motion of the motors may be used to keep the camera at a fixed orientation, or tilt angle, or pan angle, or roll angle, or a suitable combination thereof.

In an alternate embodiment, the motion of the motors may be used to point the camera at a target location. For example, the user may select the target location by specifying a distance from the camera, or at an altitude. The target location may be fixed, or the target location may vary to track a moving target object. The location of a moving target object may be determined automatically by computationally examining the image and determining the location of a main or target object within the image.

Alternatively, the target distance may set the focal distance of the camera. In a further alternative, the camera focal distance may set the target distance.

In another embodiment, the motion of the motors may be offset by additional user settings, allowing the user to adjust the camera orientation, the distance to a target, the location of a target, or any of the motion parameters.

In a further embodiment, the orientation of the monopole may be used as a command signal to determine the desired orientation or pan or tilt of the camera. For example, as the operator rolls the monopole the motors may be moved to pan or tilt the camera. Alternatively, as the operator tilts the monopole, the motors may be moved to pan or tilt the camera. The command signal may be further filtered to retain camera stabilization in combination with user control of camera orientation.

As one skilled in the art will recognize, the example embodiments may be combined to create a stabilization and control system that regulates the camera orientation relative to user movements.

The description now turns to the figures. The example embodiments will be best understood with reference to the figures, which illustrated certain representative example embodiments.

Figure 1:
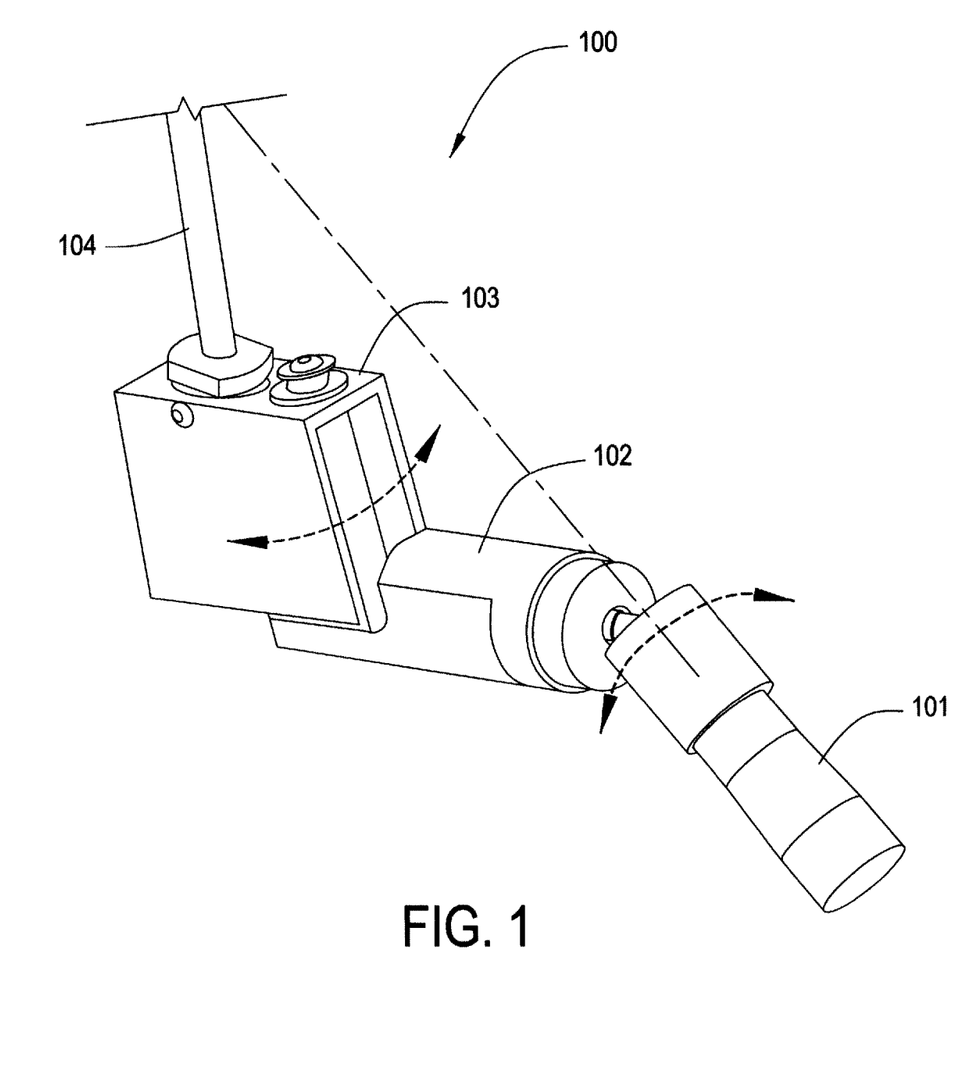
FIG. 1 illustrates a perspective view of an example motorized monopod jib for cameras.

Referring to FIG. 1, an example embodiment provides a motorized monopod jib arrangement 100 ("motorized monopod"). The motorized monopod 100 includes boom 101 which may be grasped and held by a user (e.g., camera operator). The end of the boom 101 (monopole) is illustrated in the figures. The boom 101 provides an elongated mechanism for moving the motorized monopod 100, for example when movement of the camera operator is desired. For example, a user may hold onto the boom 101 with one or both hands while walking about with the motorized monopod 100 to capture images (e.g., picture or video data) with a camera (not shown in FIG. 1). The length of the boom 101 may be modified as desired but in the examples illustrated in the figures only the distal end of the boom 101 is illustrated for convenience. In an example embodiment, the boom 101 may include one or more hand grips to facilitate a user grasping and manipulating the boom 101. The one or more hand grips may be placed proximate to the end of the boom 101 distal to an end of the boom 101 having a connection with the connection element 102 and other components of the motorized monopod 100. In an embodiment providing active controls, e.g., for tilt, roll, and/or pan, the boom 101 may include electronic components, e.g., battery and operator controls, for activating electric motors controlling movement of the camera mount or platform 105, as further described herein.

The boom 101 terminates at one end with a connection element 102. The connection element 102 may provide for adjustable connection between boom 101 and a connection element 104 attaching to the camera mount 105 (not illustrated in FIG. 1), wherein the connection element 102 and the intermediate element 103 are collectively referred to as an offset arrangement. The connection element 102 may be provided such that it is at an angle with respect to the boom 101. The angle may be adjustable, e.g., via provisioning a manual screw for tightening and loosening a fastening arrangement for the angle of the connection element 102.

In between the connection element 102 and connection element 104 attaching to the camera mount 105, an intermediate element 103 may be provided. The intermediate element 103 provides an offset connection between the end of the boom 101, i.e., at connection element 102, and connection element 104 attaching to the camera mount 105.

Still referring to FIG. 1, the connection element 104 attaching to the camera mount 105 provides support for a camera mount or platform 105 (not shown in FIG. 1) over a wide range of angles. The camera mount 105 provides an attachment portion for a camera 108. The attachment portion for a camera 108 allows for a camera 108 to be reversibly attached to the camera mount 105.

Intermediate element 103 pivots about connection element 102 by virtue of a pin arrangement, i.e., a rotation arrangement about an axis, as indicated. The pin arrangement permits intermediate element 103 and attached connection element 104 attaching to the camera mount 105 to move with respect to connection element 102, which is in turn secured to boom 101. Thus, an operator may rotate, in a controlled fashion, intermediate element about connection element 102 by turning boom 101, as indicated by dashed arrows in FIG. 1.

Figure 2:
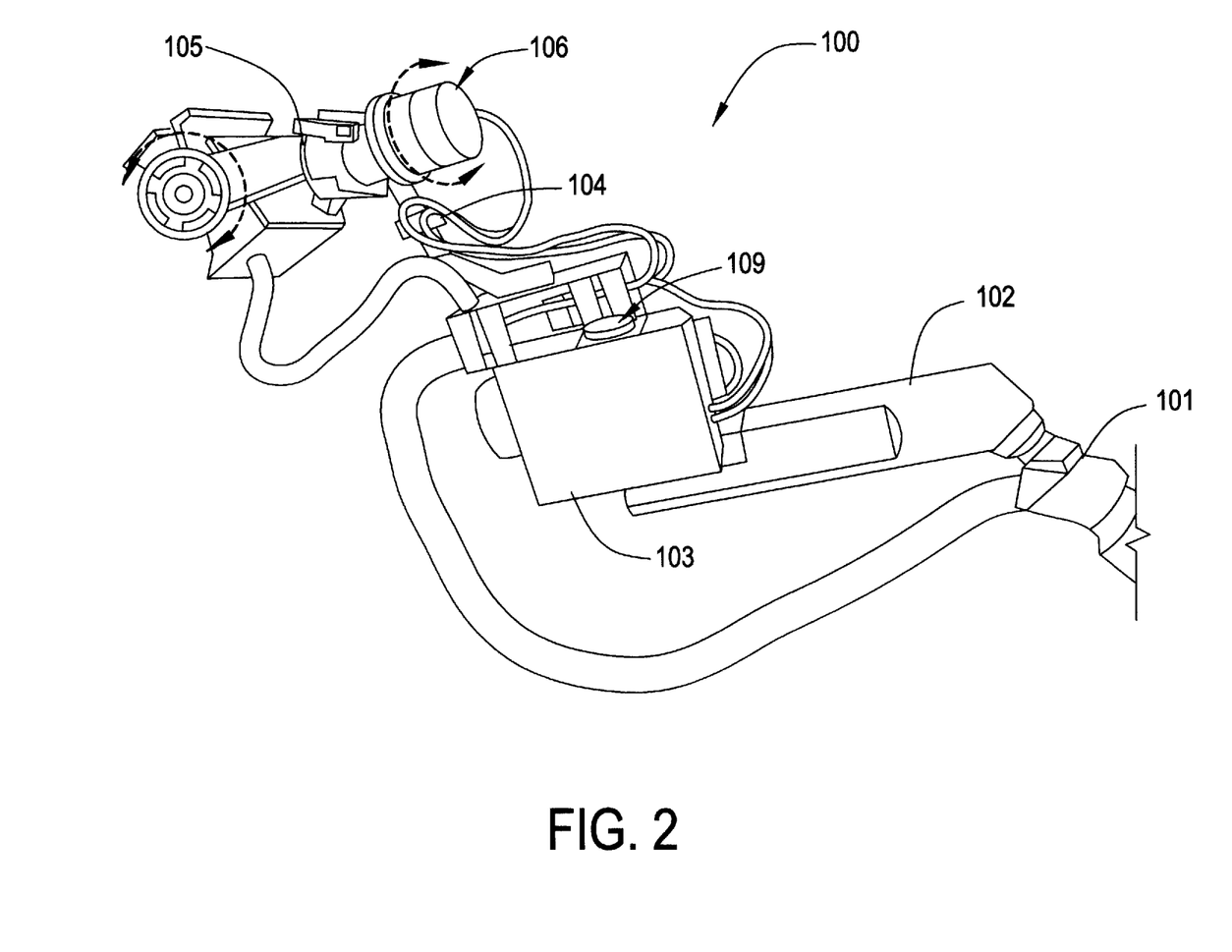
FIG. 2 illustrates a side view of an example motorized monopod jib for cameras.
Figure 3:
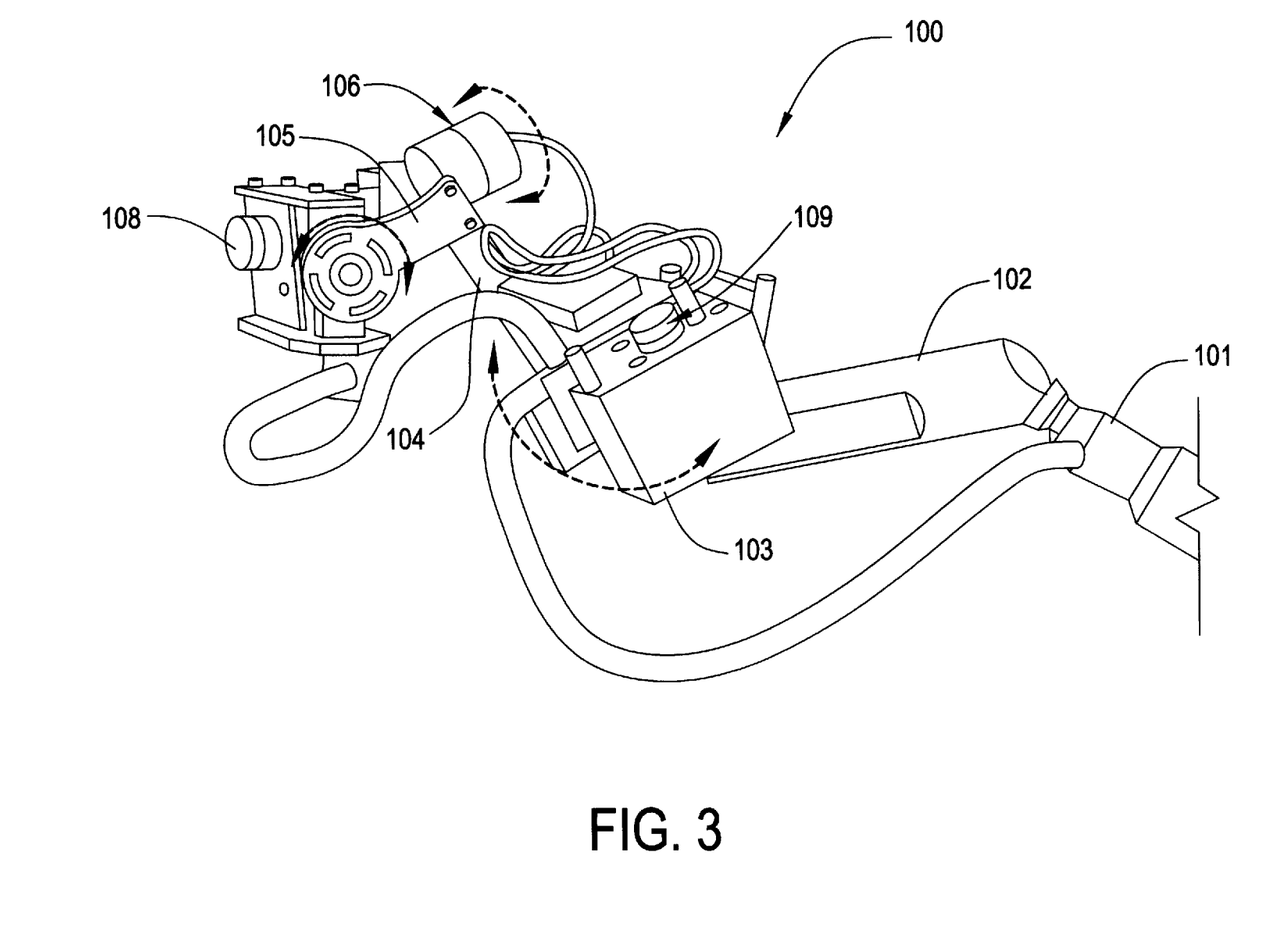
FIG. 3 illustrates another side view of an example motorized monopod jib for cameras.
Figure 4:
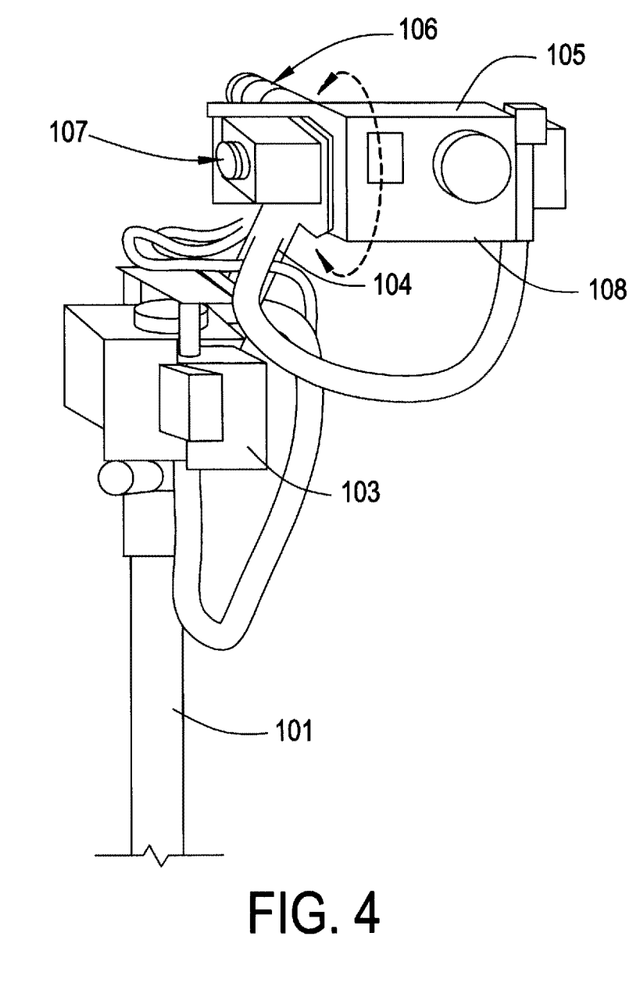
FIG. 4 illustrates a front view of an example motorized monopod jib for cameras.

Referring to FIG. 2, an embodiment provides active control to one or more degrees of freedom impacting movement of the camera mount 105 and thus the camera 108. In the example motorized monopod 101 illustrated in FIG. 2-FIG. 4, motors 106, 107, 109 are provided for controlling roll, tilt and pan/yaw, respectively. An embodiment may include one or more motors.

A camera mount 105 is connected to the offset arrangement (elements 102-103) by a connection 104 that is located where a (relatively) frictionless gimbal is used in passive counterbalancing arrangements. In an embodiment, roll is controlled about the connection 104, i.e., roll of the camera mount 105 with respect to the monopole 101, by a motor 106. This motor 106 may respond to sensor inputs, e.g., of an orientation sensor such as an inertial sensor disposed appropriately (e.g., in monopole or an external sensor), such that the motor 106 automatically controls the roll of the camera mount 105. Thus, an embodiment permits an operator to either actively control the roll, e.g., via providing inputs to an interface of the monopole 101, or the motor 106 may respond to sensor inputs to keep the roll fixed to a reference point, e.g., roll angle relative to horizon and/or a fixed input provided by the operator.

Additionally, in an embodiment a motor 107 may be located in the system to control the tilt angle of the camera mount 105 and thus the camera 108. The motor 107 acts to tilt the camera mount 105, e.g., in response to operator controls. For example, an operator may input tilt commands, e.g., via interfacing with up and down keys on a control interface of the monopole 101, to control the tilt angle of the camera mount 105 via operation of the motor 107 (motor 107 is more clearly visible in FIG. 4). As with roll, tilt may be automatically controlled in response to sensor inputs.

In an embodiment, panning may be controlled via a passive mechanism, e.g., via panning as controlled by rotating the monopole 101 itself and operation of the offset arrangement, or actively, e.g., via motor 109. That is, an additional (third) motor 109 may be provided, e.g., in a location to control movement of intermediate element 103 with respect to element 102. In this way, an operator may additionally provide active control to the panning of the camera mount 105 via inputs to a control interface that operates the motor 109. As with roll, pan may be automatically controlled in response to sensor inputs.

In this regard, one or more of the motors may be controlled automatically, e.g., in response to sensor input, as in the example described in connection with motor 106 and orientation control for the roll degree of freedom, and/or one or more of the motors may be controlled via operator input. The sensors may be located within an element physically connected to the monopole 101 and/or operatively coupled thereto, e.g., via a wired or wireless connection.

Additionally, operator input for controlling the motor(s) (either in real time or inputting of a predetermined input by the operator) may be received from a variety of controls located in a variety of locations. In one embodiment, operator controls may be provided in a control interface disposed within the monopole 101 itself, e.g., at an end of the monopole distal to the offset arrangement and camera mount 105. Additionally or in the alternative, other control interfaces may be utilized.

For example, a separate control element may be provided that is operatively coupled to the motor(s). By way of non-limiting example, a separate element may take the form of a wearable device, such as a hat or helmet worn by the operator, that in turn provides inputs to control the motor(s). This wearable device may, for example, receive explicit operator inputs and/or infer operator inputs using a variety of sensors, e.g., orientation sensors. In an embodiment that infers operator input, a wearable device such as a hat or helmet may allow an operator to look in the direction or with the orientation that the operator wishes the camera to view, and the sensors of the wearable device may relay this information to a control unit, e.g., disposed within the motorized monopod jib, such that the camera mount 105 is appropriately positioned in response thereto via action of the motor(s).

Accordingly, the various embodiments allow for actively controlling one or more degrees of freedom in a motorized monopod jib arrangement. The motorized monopod jib acts to conveniently stabilize the camera and filters out operator movements generally. At the same time, the motorized monopod jib provides the operator with an ability to control the view of the camera such that the motorized monopod jib may be employed in a wide variety of circumstances where difficult shot angles are presented.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein, it is to be understood that the embodiments are not limited to those precise embodiments, and that various other changes and modifications may be affected therein by one skilled in the art without departing from the scope or spirit of the disclosure.

What is claimed is:

1. A motorized monopod jib for a camera, comprising:
    a pole;
    an offset arrangement attached to an end of the pole, the offset arrangement comprising:
        a first element; and
        a second element, wherein an end of the first element is attached to the pole and the second element is attached to an opposite end of the first element, the first element rotatable about a first axis with respect to the end of the pole and the second element rotatable about a second axis with respect to the first element;
    a camera mount attached to the second element, wherein the camera mount is rotatable about a third axis with respect to the second element;
    one or more orientation sensors configured to determine at least an orientation of the pole; and
    at least one motor configured to impart at least a pan movement to the camera mount by controlling rotation of the second element about the second axis with respect to the first element.

2. The motorized monopod jib for a camera of claim 1, further comprising a control interface mounted on the pole.

3. The motorized monopod jib for a camera of claim 1, wherein the at least one motor comprises three motors, each of the three motors being aligned with one of the first axis, the second axis and the third axis and imparting movement to elements of the pole.

4. The motorized monopod jib for a camera of claim 1, further comprising a source of power for operating the at least one motor.

5. The motorized monopod jib for a camera of claim 1, wherein a camera pan angle is determined by roll imparted to the pole.

6. The motorized monopod iib for a camera of claim 1, wherein a camera tilt angle is determined by tilt imparted to the pole.

7. The motorized monopod jib for a camera of claim 1, further comprising a controller that controls the at least one motor.

8. The motorized monopod jib for a camera of claim 7, wherein the controller regulates the at least one motor to keep an orientation of a camera mounted on the camera mount fixed.

9. The motorized monopod jib for a camera of claim 8, wherein the fixed camera orientation is determined by the orientation of the pole.

10. The motorized monopod jib for a camera of claim 7, wherein the at least one motor acts to impart the pan movement to the camera mount by controlling rotation of the first element about the first axis with respect to the second element in response to an operator providing input to the controller.

11. The motorized monopod jib for a camera of claim 7, wherein the controller regulates the at least one motor to keep a camera mounted on the camera mount pointed at a target.

12. The motorized monopod jib for a camera of claim 11, wherein the target is a fixed distance from the camera.

13. The motorized monopod jib for a camera of claim 12, wherein the fixed distance is determined by a focal distance of the camera.

14. The motorized monopod jib for a camera of claim 11, wherein the target is located automatically by software processing a camera image.

15. The motorized monopod jib for a camera of claim 1, wherein the at least one motor comprises a first motor, a second motor, and a third motor,
    wherein the first motor is configured to impart the pan movement to the camera mount by controlling rotation of the second element about the second axis with respect to the first element,
    wherein the second motor is configured to impart a roll movement to the camera mount by controlling rotation of the camera mount about the third axis with respect to the second element, and
    wherein the third motor is configured to impart a tilt movement to the camera mount by controlling rotation of the camera mount about a fourth axis with respect to the second element.

16. A method for operating a camera attached to a monopole, comprising:
    grasping the monopole with one or more hands;
    the monopole comprising:
        a pole having an offset arrangement attached to an end of the pole, the offset arrangement comprising:
            a first element, and
            a second element,
            wherein an end of the first element is attached to the pole and the second element is attached to an opposite end of the first element, the first element rotatable about a first axis with respect to the end of the pole and the second element rotatable about a second axis with respect to the first element,
        a camera mount attached to the second element, wherein the camera mount is rotatable about a third axis with respect to the second element;
        one or more orientation sensors configured to determine at least an orientation of the pole; and
        at least one motor; and
    imparting, using the at least one motor, at least a pan movement to the camera mount by controlling rotation of the second element about the second axis with respect to the first element.

17. The method of claim 16, wherein the at least one motor acts to impart an automatic pan movement to the camera mount in response to an indication, received from the one or more orientation sensors, of unintended motion deviating the camera mount from a fixed orientation, and wherein the unintended motion is provided by an operator moving the pole.

18. The method of claim 17, wherein the fixed camera mount orientation is determined by the orientation of the pole.

19. The method of claim 16, wherein the monopole further comprises:

a controller that regulates the at least one motor to keep a camera mounted on the camera mount pointed at a target.

20. A system, comprising:
a monopole for a camera, comprising:
   a pole of length sufficient for two-handed operation;
an offset arrangement attached to an end of the pole, the offset arrangement comprising:
   a first element, and
   a second element,
   wherein an end of the first element is attached to the pole and the second element is attached to an opposite end of the first element, the first element rotatable about a first axis with respect to the end of the pole and the second element rotatable about a second axis with respect to the first element;
a camera mount attached to the second element, wherein the camera mount is rotatable about a third axis with respect to the second element;
one or more orientation sensors configured to determine at least an orientation of the pole; and
at least one motor configured to impart at least a pan movement to the camera mount by controlling rotation of the second element about the second axis with respect to the first element.

* * * * *

UNITED STATES PATENT AND TRADEMARK OFFICE
CERTIFICATE OF CORRECTION

| | |
|---|---|
| PATENT NO. | : 10,551,724 B2 |
| APPLICATION NO. | : 15/275604 |
| DATED | : February 4, 2020 |
| INVENTOR(S) | : Vincent H. Roberts et al. |

Page 1 of 1

It is certified that error appears in the above-identified patent and that said Letters Patent is hereby corrected as shown below:

In the Claims

In Column 7, Line 52, in Claim 6, delete "iib" and insert -- jib --, therefor.

Signed and Sealed this
Twelfth Day of May, 2020

Andrei Iancu
*Director of the United States Patent and Trademark Office*